United States Patent [19]
Hoefer

[11] Patent Number: 5,927,737
[45] Date of Patent: Jul. 27, 1999

[54] AUTOMOTIVE VEHICLE WITH WHEELS SUSPENDED BY TORSION BARS

[75] Inventor: Hubert Hoefer, Baden, Austria

[73] Assignee: Steyr-Daimler-Puck AG., Vienna, Austria

[21] Appl. No.: 09/022,096

[22] Filed: Feb. 11, 1998

[30] Foreign Application Priority Data

Feb. 11, 1997 [AT] Austria ................................ 212/97

[51] Int. Cl.⁶ ...................................................... F16F 1/48
[52] U.S. Cl. ................. 280/124.166; 280/124.13; 280/124.137; 280/124.149; 267/273
[58] Field of Search ................. 280/124.166, 124.13, 280/124.137, 124.149, FOR 152, FOR 157, FOR 178, FOR 174; 267/273, 274, 279, 188, 154

[56] References Cited

U.S. PATENT DOCUMENTS

| | | | |
|---|---|---|---|
| 2,702,701 | 2/1955 | Thorne et al. | 280/124.13 |
| 3,057,642 | 10/1962 | Mulholland | 280/124.166 |
| 3,913,939 | 10/1975 | Sinclair et al. | 280/124 F |
| 4,010,941 | 3/1977 | Kirkland | 267/57 |
| 4,884,790 | 12/1989 | Castrilli | 267/273 |
| 5,176,370 | 1/1993 | Yamamoto | 267/273 |
| 5,520,376 | 5/1996 | Langa et al. | 267/273 |
| 5,580,079 | 12/1996 | Pradel et al. | 280/124.166 |

FOREIGN PATENT DOCUMENTS

| | | | |
|---|---|---|---|
| 866 621 | 5/1941 | France | 280/FOR 157 |
| 1024607 | 2/1986 | Japan | 280/FOR 157 |
| 2154187 | 4/1985 | United Kingdom | 280/FOR 157 |

*Primary Examiner*—Christopher P. Ellis
*Attorney, Agent, or Firm*—Karl Hormann

[57] ABSTRACT

The invention relates to an automotive vehicle with a torsion bar suspension for wheels mounted at one end of a road arm the other end of which is permanently connected to one end of each of a pair of concentrically mounted internal and external torsion bars, the internal torsion bar being at its other end secured against rotation in an anchor block at the side of the vehicle opposite from the road arm and the other end of the external torsion bar being rotatable on the anchoring block and provided with a radially extending arm cooperating with an abutment the position of which is adjustable.

12 Claims, 3 Drawing Sheets

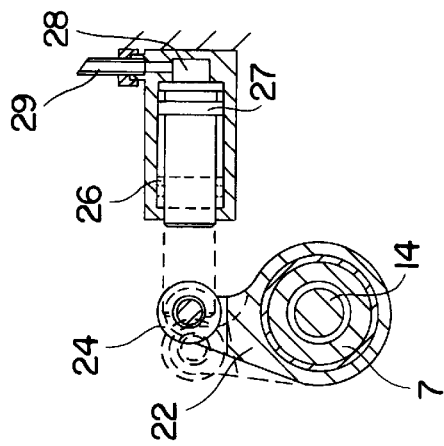
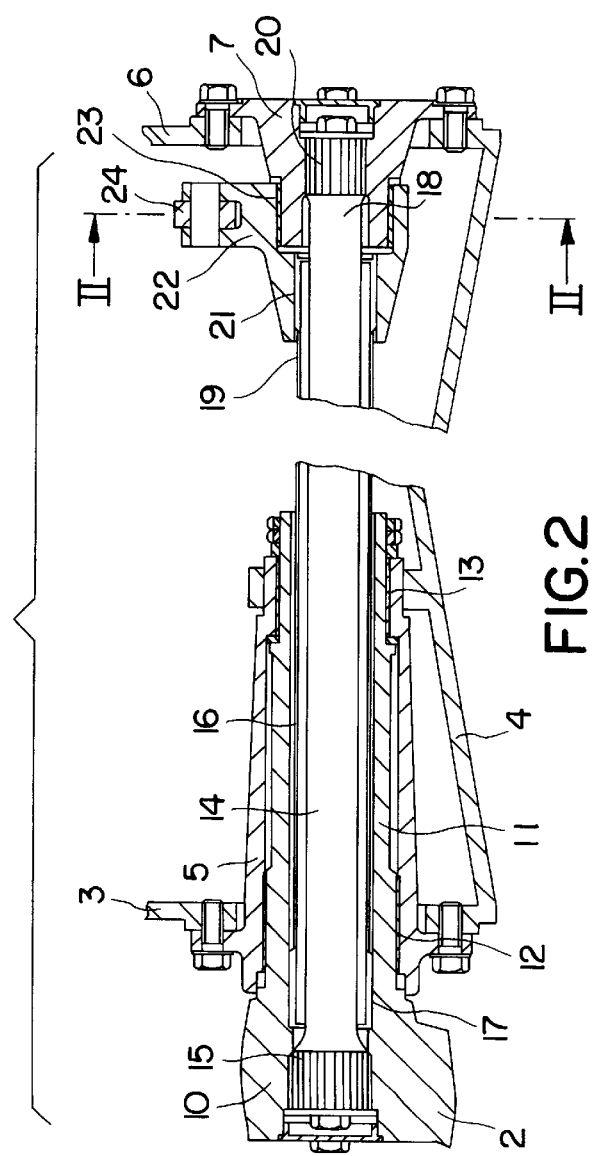

AUTOMOTIVE VEHICLE WITH WHEELS SUSPENDED BY TORSION BARS

BACKGROUND OF THE INVENTION

1. Field of the Invention

The invention, in general, relates to an automotive vehicle provided with a plurality of wheels suspended by torsion bars and, more particularly, to vehicles of the kind equipped with wheels resiliently suspended by torsion bars extending substantially transversely of the vehicle and consisting of a pair of concentrically arranged internal and external torsion springs with a wheel-supporting road arm cooperating with one end of the internal and external torsion springs. The invention is of particular advantage for use in track-laying vehicles.

2. The Prior Art

U.S. Pat. No. 3,913,939 issued Oct. 21, 1975 to Sinclair et al. discloses a wheel suspension for track-laying vehicles, such as combat tanks, having wheels mounted on road arms and supported by pairs of coaxial torsion springs. As disclosed, each road arm is connected to an end of only the internal torsion bar the other end of which is journalled for rotation in an anchor element affixed to the hull of the vehicle. The anchor element is provided with a lever or height control arm connected to a rod which in turn is connected to an hydraulic cylinder or ram. Furthermore, an end of an external torque tube is rigidly mounted to the anchoring element for rotation therewith, its other end being connectable with the road arm by way of a lost motion device.

If the hydraulic system disclosed for use with that suspension fails, or if the rod breaks, the internal torsion bar will rotate freely because the external torque tube is also connected to the road arm. Thus, in case of a systems failure, the vehicle is rendered defunct. The only function of the lost motion device is that when the system is operative, the external torque tube will lend added support to the internal torsion bar, but only after it has rotated by an amount predetermined by the angular disposition of the height control arm. This is demonstrated by an abrupt change in its characteristic curve. Hence, the hardness of the spring suspension cannot be set independently of the angular disposition of the road arm, as a function of the deflection of the spring. Moreover, certain driving conditions mandate selectively variable wheel loads. These cannot be attained by means of the disclosed rod connection.

OBJECTS OF THE INVENTION

It is, therefore, a primary object of the invention to provide a wheel suspension, particularly for combat vehicles, which is substantially failure-proof.

Another object of the invention is to provide a wheel suspension which is adaptable to various driving conditions.

Yet another object of the invention is to provide a compact wheel suspension requiring as little mounting space as possible.

BRIEF SUMMARY OF THE INVENTION

In an advantageous embodiment of the invention there is provided a suspension for a plurality of wheels arranged serially of a vehicle, including an elongate torsion member for least one of such wheels extending substantially transversely of the vehicle and consisting of concentrically arranged internal and external torsion bars with their opposite end sections being posioned adjacent to opposite sides of the vehicle, a road arm adjacent one side of the vehicle having a first end for rotatably supporting a wheel and a second end affixed to one of the end sections of both the internal and external torsion bars, means for securing the internal torsion bar against rotation at its other end, abutment means supported by the vehicle, and arm means having a first portion affixed to the other end of the external torsion bar for rotation therewith and a second portion in operative engagement with the abutment.

In a particularly preferred embodiment of the invention the position of the abutment is selectively adjustable.

Other advantages and details of the invention will in part be obvious and will in part appear hereinafter.

As herein described, it will be seen that the two torsion springs are disposed in parallel and that they are at all times connected to the road arm for rotation therewith. Their requirements as to structural space do not exceed those of a single torsion bar. The internal torsion spring is a torque shaft which is rigidly connected and which is always supporting. It is dimensioned so as to provide for a soft spring action. The external torsion bar is a torque tube which becomes effective as a function of torsion determined and adjustable by an adjustable abutment.

Preferably, the abutment is constituted by a hydraulic cylinder unit which may be adjusted by fluid pressure energization. Since the two torsion springs are arranged in parallel the required forces are less, and only a small structural space is required for the hydraulic cylinder unit. With its control valves in a closed state, the hydraulic cylinder unit acts as an abutment rather than as a spring. Thus the spring characteristics may be adjusted such that its characteristic curve becomes more steeply inclined beginning at an adjustable load or spring action. By varying the pressure, the slope of the characteristic curve may also be adjusted.

In an improved embodiment of the invention a cylinder unit is associated with each of the wheels. These cylinder units are arranged in a plurality, for instance three, groups, and each group is connected to a common hydraulic supply system by its own control valve.

The advantage of small structural space increases with the number of cylinder units. It is possible to energize all cylinder units. However, it has been found to be equally advantageous yet simpler to arrange the cylinder units in groups, i.e. one group for the front wheels, one group for the intermediate wheels, and one group for the rear wheels. In this manner, the spring constant and the wheel load may be selectively adjusted and set in accordance with the dynamics of prevailing driving conditions. Thus, when the vehicle is turning, energy will be saved and the driving surface will be protected by increasing the wheel load of the intermediate wheels. For purposes of stabilization during shooting, the wheel pressure of the forward or rear group may be set to a higher value. However, during vehicle movement the valves may remain open more or less. All cylinder units will then be connected to each other by the pressure conduits. This will be understood by those skilled in the art to result in a suspension system which will compensate for and dampen unevenness in the road surface.

Providing an additional pressure storage in the fluid pressure supply system will result in an additional spring common to the entire suspension system. Such a spring will absorb high frequency shocks of low amplitude. Hence, its effect is basically different from individual gas springs associated with each wheel. In this manner, additional advantages are attained: As an energy storage, the common gas spring assists in the rapid simultaneous energization of the cylinders, and a relatively small hydraulic pump will be sufficient.

DESCRIPTION OF THE SEVERAL DRAWINGS

The novel features which are considered to be characteristic of the invention are set forth with particularity in the appended claims. The invention itself, however, in respect of its structure, construction and layout as well as manufacturing techniques, together with other objects and advantages thereof, will be best understood from the following description of preferred embodiments when read in connection with the appended drawings, in which:

FIG. 2 is a sectional view along line II—II of FIG. 1;

FIG. 3 is a detailed sectional view along line III—III of FIG. 1; and

DETAILED DESCRIPTION OF PREFERRED EMBODIMENTS

Figure 1:
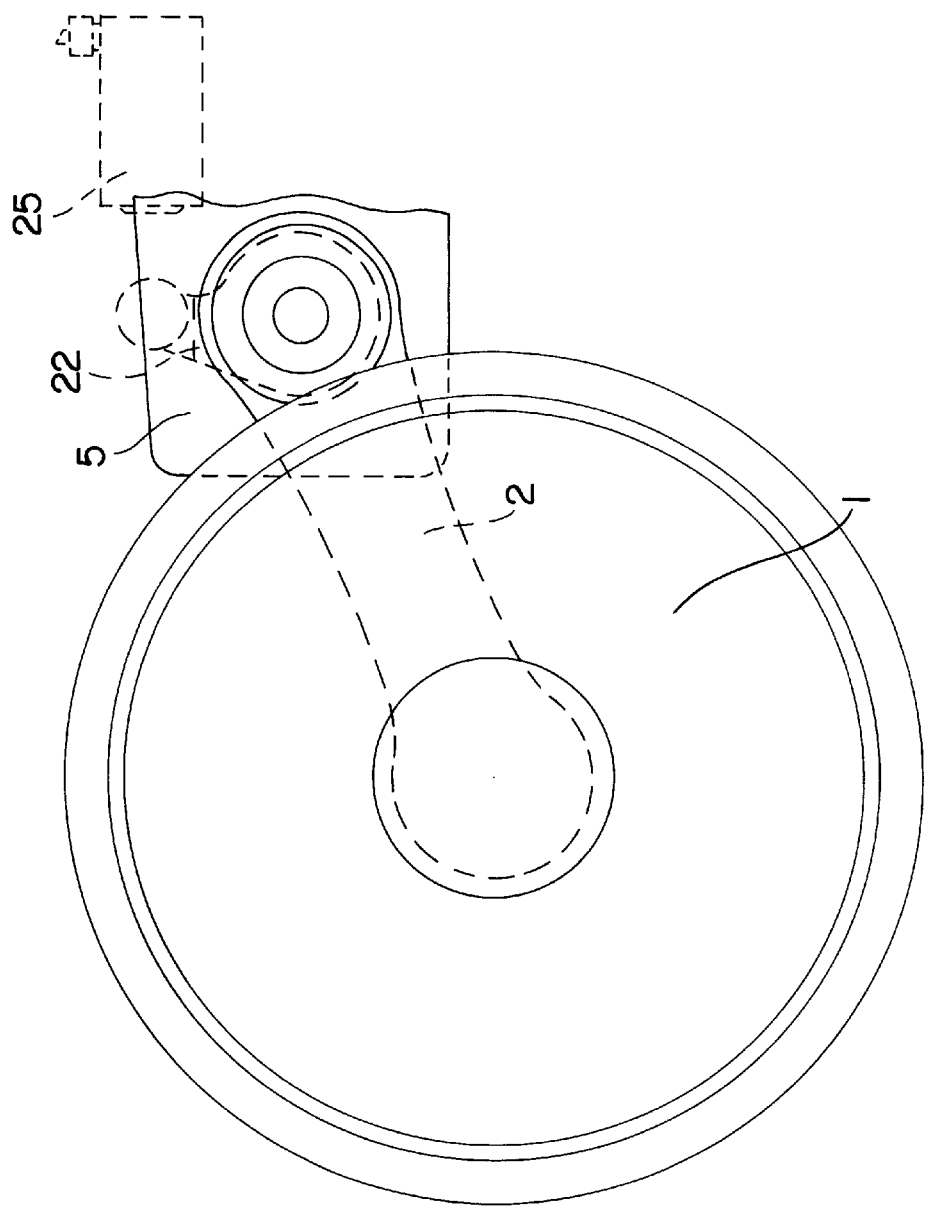
FIG. 1 is a schematic side view, with parts broken away, of a vehicle in accordance with the invention.

Only one wheel designated 1 is shown in FIG. 1. It represents either one of six or eight wheels of an armored wheeled vehicle or a road wheel of a track laying vehicle such as a battle tank (neither shown). As shown in FIG. 2, the wheel 1 is suspended from a road arm 2 which, in turn, is pivotally mounted adjacent to an exterior side of a hull of the vehicle. To this end, a load bearing sleeve 5 is affixed in a side wall 3 of the hull and supported by the bottom 4 of the hull. The wall at the opposite side of the vehicle is represented by reference numeral 6 and is seen to support an anchoring element 7. A hub 10 is formed at the end section of the road arm 2 adjacent the vehicle. The hub 10 is provided with a tubular extension 11. The extension 11 is journaled in antifriction bearings 12, 13 within the load bearing sleeve 5.

An internal rotary spring 14 formed as a torsion bar is at one of its end sections affixed by splining 15 to the hub 10 of the road arm 2. An external rotary spring 16 formed as a torque tube is affixed to the extension 11 by a further spline 17 positioned somewhat further inwardly of the interior of the vehicle than the spline 15. The internal torsion bar 14 is secured against rotation at its other end section 18 by a spline 20 in the anchoring element 7 at the opposite side of the vehicle. The other end section 19 of the external torque tube 16 is connected to an arm 22 by means of a further spline 21. The arm 22 is mounted for rotation on the anchoring element 7 by means of a further antifriction bearing 23, and at its free end section the arm 22 is provided with a pressure roller 24. As shown in FIG. 1, the pressure roller 24 is cooperating with an abutment 25. In a preferred embodiment, the position of the abutment is adjustable.

Instead of the abutment 25 of FIG. 1, FIG. 3 depicts an hydraulic cylinder unit 26. A piston 27 of the cylinder unit 26 constitutes an abutment cooperating with the pressure roller 24. A pressure chamber 28 is provided within the cylinder unit 26 at the side of the piston 27 facing away from the pressure roller 24. The pressure chamber 28 is connected to an hydraulic system to be described, by way of a pressure conduit 29.

Figure 4:
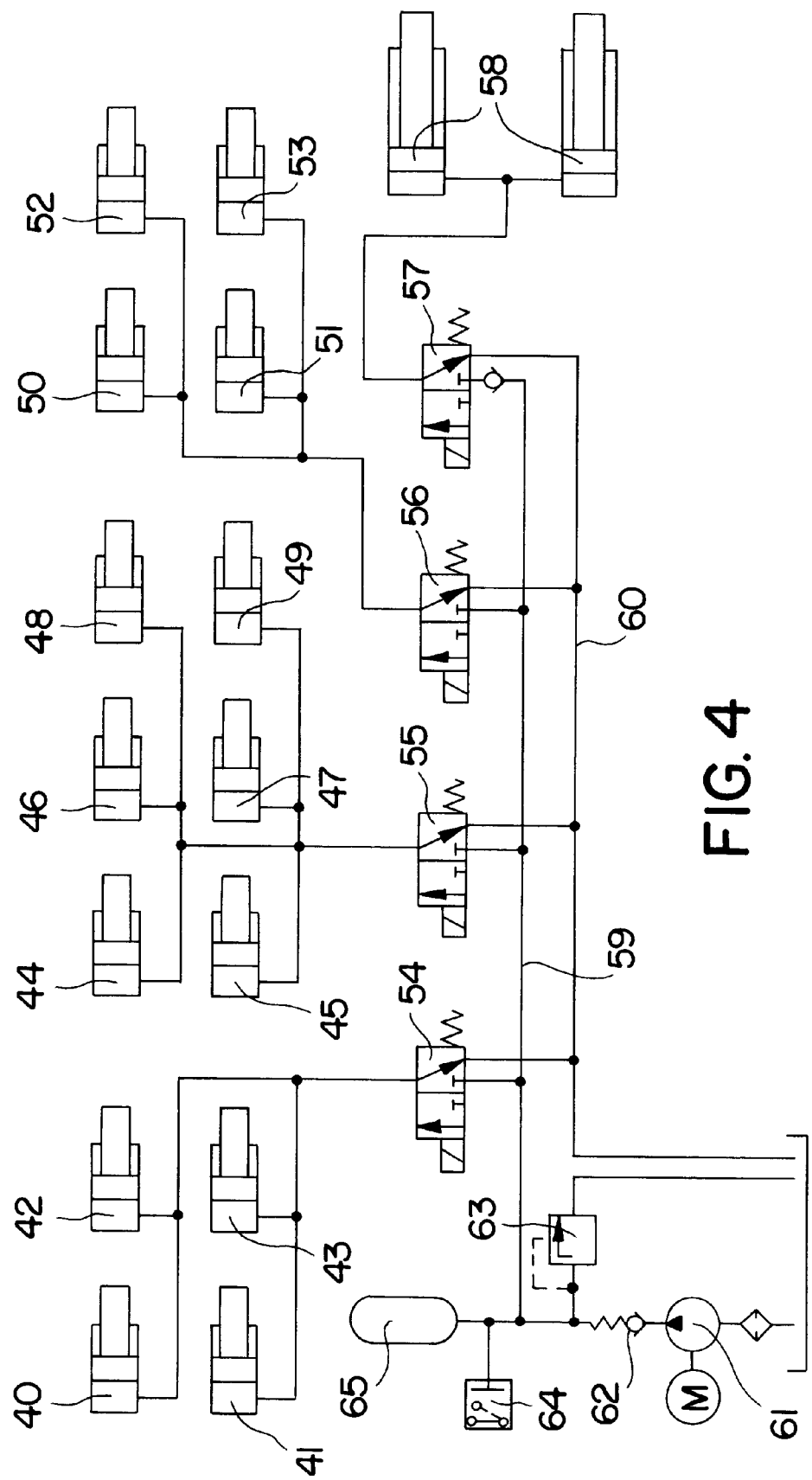
FIG. 4 is a schematic representation of the hydraulic system of a preferred embodiment of the invention.

An exemplary hydraulic system for use with a tracklaying vehicle is shown in FIG. 4. In the example shown, a cylinder unit 40–53 is associated with each road wheel (not shown) of such a vehicle (also not shown). Even-numbered units are presumed to be at the right side of such vehicle; odd-numbered units are presumed to be located at the left side of such vehicle. Units 40–43 constitute a first group within a first control circuit supplied with pressure fluid by way of a valve 54. Units 44–49 are associated with the intermediate road wheels; they constitute a second group and are supplied with pressure fluid by way of a valve 55. Units 50–53 are associated with the rear road wheels; they constitute a third group and are supplied with pressure fluid by way of a valve 56. Further hydraulic pistons 58, such as may be used for tightening the tracks, for instance, may be connected by way of a further valve 57.

The valves 54–56 are connected to a feed conduit 59 and to a return conduit 60. Hydraulic fluid is fed by a pump 61 through a check valve 62 into the central pressure conduit 59 which supplies the entire system, by-passing a pressure limiting valve 63 connected in a by-pass. In addition, a pressure storage 65 which may be a gas-filled bubble storage and a pressure monitor 64 are connected to the pressure conduit 59.

Since the cylinder units 40–43 need only be single-action units, the valves, too, may be of relatively simple construction. They may be energized separately for each of the three groups of units. When the cylinder units are in their energized state, the pistons forming the abutments will assume a predetermined fixed position. Accordingly, commencing with an abrupt change, and starting at a predetermined spring deflection, the slope of the characteristic curve of the torsion bar will be steeper.

When the valves are opened all cylinder units will be connected to the pressure conduit 59 and to the pressure storage 65 so that the pressures in individual cylinder units may balance each other whereby the second torsion bar will be supported additionally by a pneumatic spring, i.e. the pressure storage 65. In this manner, the slope of the spring characteristic curve will be slightly progressive.

What is claimed is:

1. Automotive vehicle, comprising:

a plurality of wheels arranged serially at opposite sides of said vehicle;

elongate torsion means extending substantially transversely of said vehicle and comprising concentrically arranged internal and an external torsion bars having first and second end sections adjacent to opposite sides of said vehicle;

a road arm adjacent to one side of said vehicle and comprising a first end for rotatably supporting one of said plurality of wheels and a second end affixed to one of said first and second end sections of said internal and external torsion bars;

means for securing said internal torsion bar against rotation at the other of its said first and second end sections;

abutment means supported by said vehicle;

arm means comprising a first portion affixed to said external torsion bar at the other of its said first and second end sections for rotation therewith and, remote from said first section, a second portion in operative engagement with said abutment.

2. The vehicle of claim 1, wherein the other of said first and second end sections of said internal torsion bar is secured in load bearing means mounted adjacent to the opposite side of said vehicle.

3. The vehicle of claim 2, wherein said arm means is rotatably supported by said load bearing means.

4. The vehicle of claim 3, wherein said abutment means is adjustable relative to said vehicle.

5. The vehicle of claim 4, wherein said abutment means comprises piston means of hydraulic motor means connected to fluid pressure means supply for moving said piston means.

6. The vehicle of claim 5, wherein piston cylinder means is associated with each of said plurality of wheels.

7. The vehicle of claim 6, wherein said plurality of wheels is divided into a plurality of groups connected to said fluid pressure supply means by separate valve means.

8. The vehicle of claim 7, wherein said fluid pressure supply means comprises fluid pressure storage means.

9. The vehicle of claim 8, wherein pump means is connected to said fluid pressure supply means by check valve means.

10. The vehicle of claim 9, wherein said pump means is provided with pressure limiting means.

11. The vehicle of claim 10, wherein said fluid pressure storage means is provided with pressure monitoring means.

12. The vehicle of claim 11, wherein said vehicle is a tracks laying vehicle and wherein further piston cylinder means is connected to said fluid pressure supply means by valve means for selectively tightening said tracks.

* * * * *